May 26, 1925.
E. IBACH
CHAIN HOOK
Original Filed Nov. 21, 1923
1,539,117
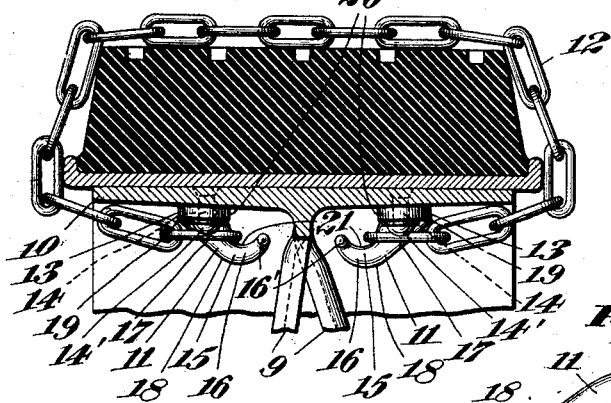
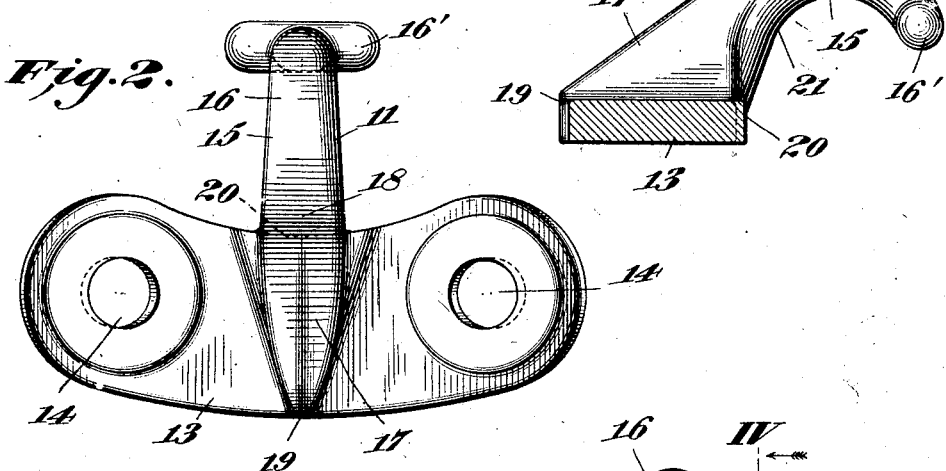
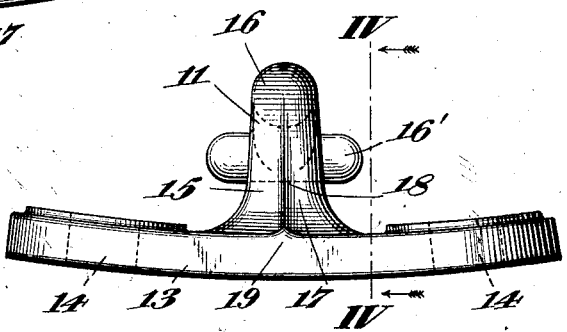
INVENTOR
Emil Ibach.
BY R.S.A. Dougherty and
A. B. Reavis
ATTORNEYS Patented May 26, 1925.

1,539,117

UNITED STATES PATENT OFFICE.

EMIL IBACH, OF HOBOKEN, NEW JERSEY, ASSIGNOR TO BETHLEHEM STEEL COMPANY, OF BETHLEHEM, PENNSYLVANIA, A CORPORATION OF PENNSYLVANIA.

CHAIN HOOK.

Application filed November 21, 1923, Serial No. 676,195. Renewed December 8, 1924.

*To all whom it may concern:*

Be it known that I, EMIL IBACH, a citizen of the United States, and residing at Hoboken, county of Hudson, State of New Jersey, have invented certain new and useful Improvements in Chain Hooks, of which the following is a specification.

My invention relates to chain hooks of the type adapted for attachment to motor vehicle rims for the purpose of securing in place ends of antiskid chains and it has for an object to provide a hook of this character which shall be strong and durable.

A further object of my invention is to provide hook ends arranged close to the web and spoke construction of a wheel, whereby such web and spoke construction assists in keeping chains on the hooks.

Chain hooks are commonly provided on the inner peripheries of metallic wheels for the attachment of antiskid chains. Such hooks as ordinarily constructed comprise base portions adapted to be riveted to the inner faces of wheel rims and hook portions extending from the base portions but they have proved to be not entirely satisfactory owing to the lack of strength and the tendency of chains to work up on the hook portions thereby submitting the latter to excessive strains. I have provided a new type of chain hook in which the hook portion springs from the base member throughout the width of the latter so as to provide a hook member having a relatively deep section adjacent to the base member to resist bending stresses, the hook member being defined by an inclined tapering member the top edge of which extends from one edge of the base member, over the latter, and terminates to one side of the other edge of the base member while the bottom side of the hook member extends from the other edge of the base member. The oblong section of the hook or retaining member near the base member serves to prevent a chain link from turning, twisting, and crawling with respect to the hook member and the sliding inner surface of the hook member serves to cause a link to tend to move toward the base member when a chain is pulled. These two features cooperate to keep the links about the hooks close to the base members, whereby the chains are not likely to move out toward the retaining member or hook ends and result in bending or breaking of the latter. The base member is preferably curved so that the center line of the attaching rivets may be brought quite close to the front side of the hook portion, whereby chain pulls are transmitted very largely as shearing stresses in the rivets, thereby making a very strong construction as rivets are capable of standing much greater loads in shear than in tension.

Apparatus made in accordance with my invention, is illustrated in the accompanying drawings, forming a part of this application, in which:

Figure 1 is a detail fragmentary sectional view of a wheel showing my improved chain hooks applied thereto;

Figure 2 is a plan view of my improved chain hook;

Figure 3 is a view in side elevation of the hook; and

Figure 4 is a sectional view taken along the line IV—IV of Figure 3.

Referring now to the drawings I show, in Figure 1, a portion of a motor vehicle wheel having a web 9 and a rim 10 with chain hooks 11 of my improved type attached to the inner face of the rim, ends of a chain 12 being shown in engagement with the hooks 11.

Referring to Figures 2, 3 and 4, my improved chain hook 11 comprises a base portion 13 having rivet openings 14 and a hook or retaining portion 15 which springs from the top of the base portion 13 substantially throughout the width of the latter and which terminates in an outer portion 16 curved toward the plane of the base portion 13. A cross bar 16′ is arranged at the outer end of the curved portion to assist in retaining a chain link.

Referring to Figure 4, it will be seen that the retaining or hook member 15 consists of an inner shank portion 17 inclined at an acute angle with respect to the base member and that such a shank portion springs from the base member substantially throughout the full width of the latter. The shank portion 17 is tapered outwardly and it merges into the curved portion 16 which terminates in a cross bar 16′ as already described. From the structure described, it will be apparent that the top side 18 of a hook or retaining member 15 extends from one edge 19 of the base member 13, across the base member, laterally to one side of the other edge 20 of the base member 13, and then curves inwardly toward the plane of the base member while the bottom side or inside 21 of the hook or retaining member 15 extends from the edge 20 of the base member at an acute angle and then, like the top side, it is curved inwardly toward the plane of the base member.

Referring to Figure 2, it will be seen that the base member 13 is curved in two directions. It is curved in one direction to fit the inner periphery of a wheel rim and it is curved in the other direction to provide a strong anchorage for a chain end. By having the edge 20 adjacent to the hook or retaining member 15 concave, the line of centers of the rivet openings are brought quite close to the inside of the hook or retaining member contiguous to the edge 20, whereby the pull of a chain on the retaining or hook member is transmitted very largely as shearing stresses in the rivets 14'.

Upon reference to Figure 1, it will be seen that opposed hooks and their hook or retaining portions 16 extend toward each other with the cross bars 16' sufficiently close to the web and spoke constructions 9 that the latter cooperates to keep the chain links on the hook or retaining members. A chain link may be put on by arranging it substantially parallel with respect to a cross bar 16' and then passing it edgewise until one side of the link is below the cross bar, whereupon the link may be turned and passed over the cross bar 16'. Thereafter the link is turned substantially 90° and slipped down the shank portion 17 with the link sides substantially parallel to the sides of the shank portion.

From the foregoing, it will be apparent that I have devised a chain hook construction which is strong and durable, these characteristics being dependent upon the design of hook whereby the chain normally tends to move toward the base portion thereof and whereby a terminal chain link is positively prevented from twisting or turning with respect to a hook member. Furthermore, by having the retaining or hook portions spaced from the spoke and web construction by distances only slightly in excess of the diameter of the link stock, it is necessary to bring a link into parallelism with a cross bar and move it in a particular way in order to place a link on a hook or remove it from the latter, whereby, in operation, the likelihood of a chain working loose is greatly reduced. Also curvature of the base portion so as to bring the attaching rivets near to the front edge of the hook or retaining portion serves to provide a very strong construction in that loads are transmitted very largely as shearing stresses in the rivets.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention, what I claim as new and desire to secure by Letters Patent is:

1. A hook for retaining one end of an anti-skid chain of the cross chain type and adapted for attachment to the felloe of a motor vehicle wheel comprising a base member and a hook member integral with and springing from the base member for approximately the full width of the latter, said hook member facing away from the base member for bearing the load imposed by a chain.

2. A device for retaining one end of an anti-skid cross tire chain of a motor vehicle wheel in place comprising a hook consisting of a laterally curved base member having rivet openings near the ends thereof, whereby the hook may be secured in place with respect to the felloe of a motor vehicle wheel, a hook member integral with and springing from the outer surface of the base member for approximately the full width of the latter and projecting beyond the concave side thereof, said hook member being adapted to receive a link of an anti-skid chain and having a surface which faces away from the base member for bearing the load imposed by a chain, and means cooperating with the hook member for obstructing disengagement of a chain link therefrom.

3. A hook for retaining one end of an anti-skid chain of the cross chain type and adapted for attachment to the felloe of a motor vehicle wheel comprising a base member and a hook member integral with and springing from the base member for substantially the full width of the latter and extending laterally and outwardly from the outer surface of the base member to provide a chain load-bearing surface which faces away from the base member and which is inclined toward the latter, whereby, in service, a chain link engaging about the hook member is urged toward the base member to secure an effective support for the chain.

4. A device for retaining one end of an anti-skid cross tire chain of a motor vehicle wheel in place comprising a hook consisting of a laterally curved base member having rivet openings near to the ends thereof, whereby the hook may be secured in place with respect to the felloe of a motor vehicle wheel, a hook member springing from the base member for substantially the full width thereof and extending laterally and outwardly from the outer surface of the base member and projecting beyond the concave side of the latter to provide a chain load-bearing surface which faces away from the base member and which is inclined toward the latter, whereby, in service, a chain link surrounding the hook member is, due to the pull of the chain, urged toward the base member to secure an effective support for one end of the chain close to the center line joining the rivet openings, and means cooperating with the hook member for obstructing disengagement of a chain link therefrom.

In testimony whereof I hereunto affix my signature this 19th day of November, 1923.

EMIL IBACH.